(12) United States Patent
Myouga

(10) Patent No.: US 10,228,883 B2
(45) Date of Patent: Mar. 12, 2019

(54) STORAGE DEVICE THAT POSTPONES COMPLETION OF READ COMMAND TO BEGIN EXECUTION OF A NON-READ COMMAND

(71) Applicant: Toshiba Memory Corporation, Tokyo (JP)

(72) Inventor: Nobuyuki Myouga, Iruma Saitama (JP)

(73) Assignee: Toshiba Memory Corporation, Tokyo (JP)

( * ) Notice: Subject to any disclaimer, the term of this patent is extended or adjusted under 35 U.S.C. 154(b) by 48 days.

(21) Appl. No.: 15/442,344

(22) Filed: Feb. 24, 2017

(65) Prior Publication Data

US 2017/0262230 A1    Sep. 14, 2017

(30) Foreign Application Priority Data

Mar. 11, 2016 (JP) .................................. 2016-048797

(51) Int. Cl.

| G06F 12/00 | (2006.01) |
| G06F 3/06 | (2006.01) |
| G06F 13/00 | (2006.01) |
| G06F 13/28 | (2006.01) |

(52) U.S. Cl.
CPC .......... *G06F 3/0659* (2013.01); *G06F 3/0604* (2013.01); *G06F 3/0611* (2013.01); *G06F 3/0656* (2013.01); *G06F 3/0673* (2013.01); *G06F 3/0679* (2013.01)

(58) Field of Classification Search
CPC .... G06F 3/0659; G06F 3/0604; G06F 3/0656; G06F 3/0673; G06F 3/0679
See application file for complete search history.

(56) References Cited

U.S. PATENT DOCUMENTS

| 5,958,066 | A | * | 9/1999 | Kedem | ............... | G06F 11/2221 |
| | | | | | | 711/100 |
| 6,330,642 | B1 | * | 12/2001 | Carteau | ............... | G06F 11/2092 |
| | | | | | | 711/114 |
| 6,513,089 | B1 | * | 1/2003 | Hofmann | ................ | G06F 13/28 |
| | | | | | | 710/107 |
| 8,504,737 | B2 | | 8/2013 | Rysavy | | |
| 8,868,809 | B2 | | 10/2014 | Noeldner et al. | | |
| 9,152,585 | B2 | | 10/2015 | Ware | | |
| 2002/0199071 | A1 | * | 12/2002 | Kitamura | ................ | G06F 21/80 |
| | | | | | | 711/152 |
| 2003/0188007 | A1 | * | 10/2003 | Unger | ..................... | G06F 13/28 |
| | | | | | | 709/232 |
| 2012/0192196 | A1 | * | 7/2012 | Yasuda | .................. | G06Q 10/10 |
| | | | | | | 718/103 |

(Continued)

*Primary Examiner* — Mark A Giardino, Jr.
(74) *Attorney, Agent, or Firm* — Kim & Stewart LLP

(57) ABSTRACT

A storage device includes a non-volatile storage, and a controller configured to carry out, in parallel, operations in response to a plurality of commands received from a host and queued in a command queue. When the controller receives, from the host, a read command and then a subsequent command before all data read from the non-volatile storage are transmitted to the host in response to the read command, the controller transmits a response to the subsequent command after part of the data read from the non-volatile storage are transmitted to the host and before the all data read from the non-volatile storage are transmitted to the host.

16 Claims, 17 Drawing Sheets

(56) References Cited

U.S. PATENT DOCUMENTS

2012/0221679 A1* 8/2012 Yamamoto ............. G06F 13/20
709/217
2015/0074293 A1* 3/2015 Nagata ................. G06F 3/0659
710/5

* cited by examiner

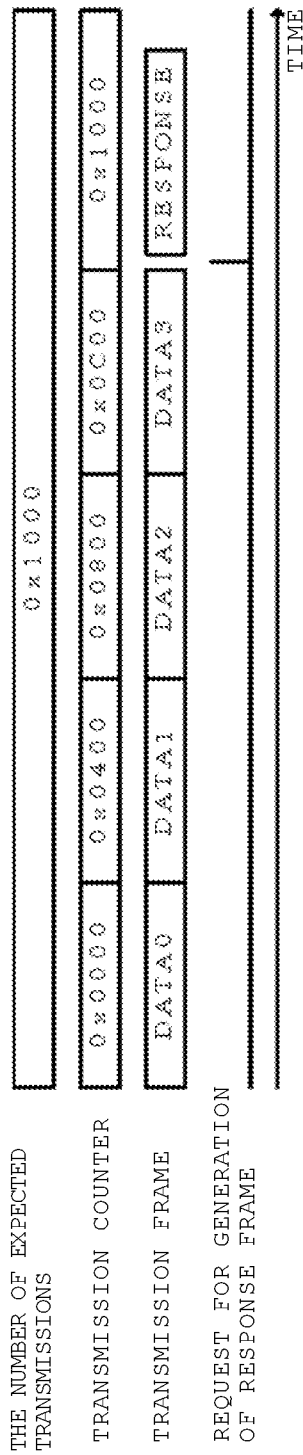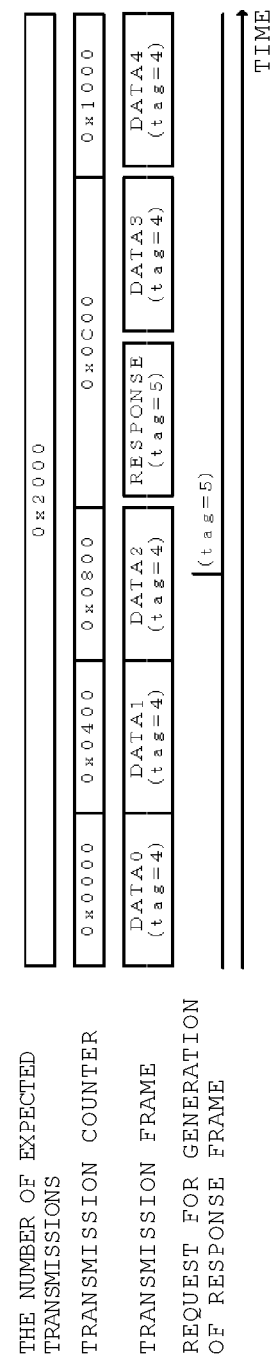

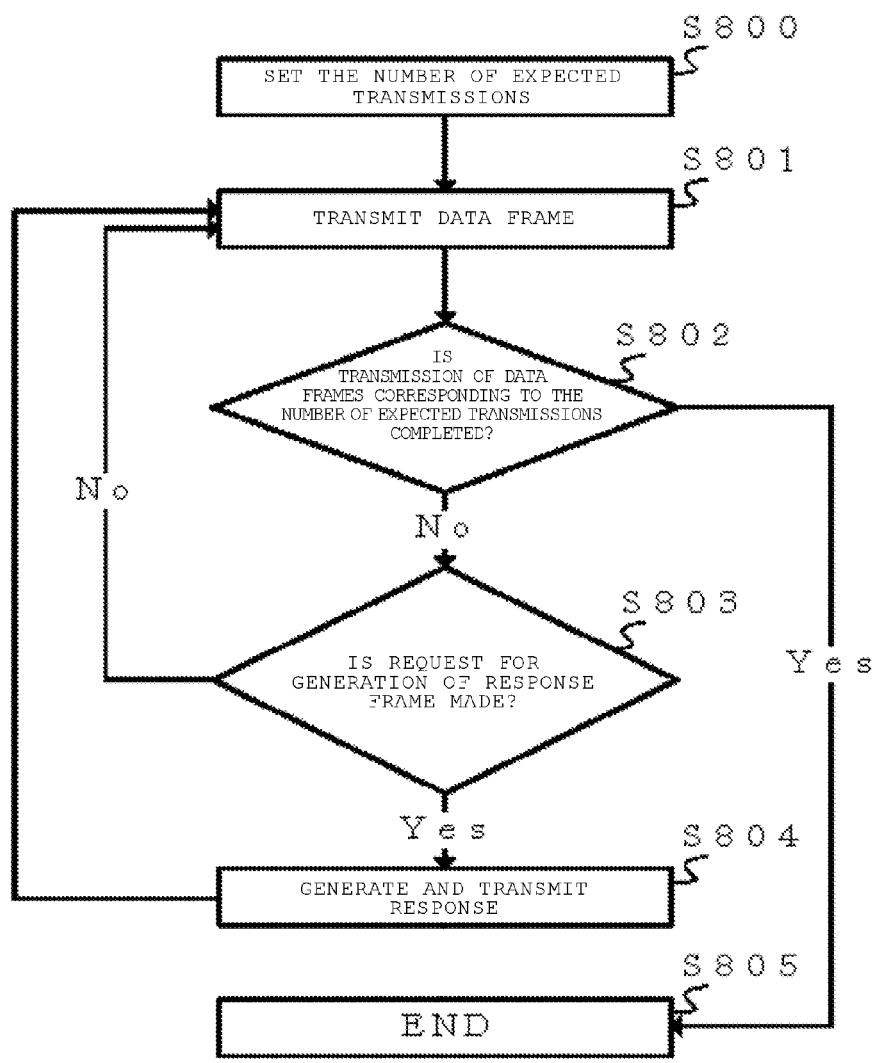

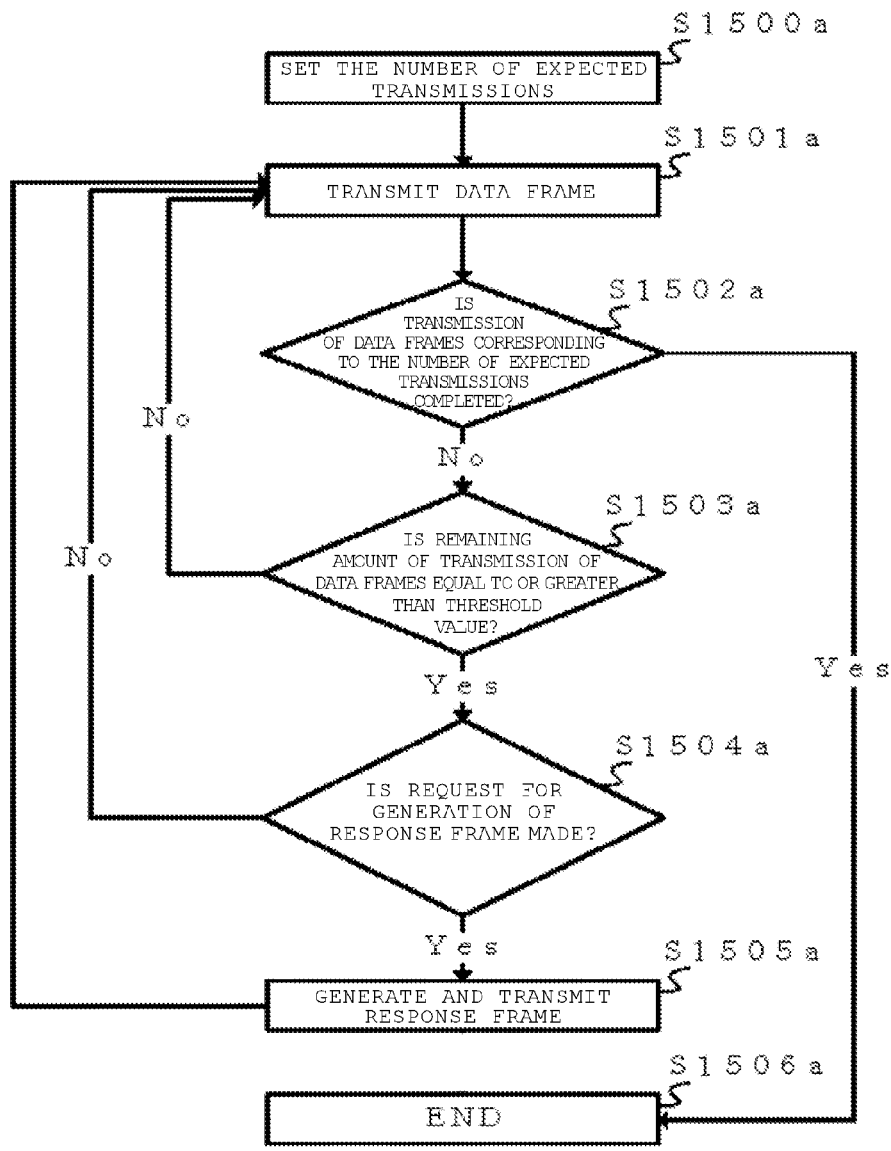

US 10,228,883 B2

STORAGE DEVICE THAT POSTPONES COMPLETION OF READ COMMAND TO BEGIN EXECUTION OF A NON-READ COMMAND

CROSS-REFERENCE TO RELATED APPLICATION

This application is based upon and claims the benefit of priority from Japanese Patent Application No. 2016-048797, filed Mar. 11, 2016, the entire contents of which are incorporated herein by reference.

FIELD

Embodiments described herein relate generally to a storage device.

BACKGROUND

To improve performance of a storage device that queues and executes commands received from a host, it is important to transmit information regarding execution of the respective commands to the host in an appropriate order.

DESCRIPTION OF THE DRAWINGS

FIG. 6 is a timing chart when the storage device according to the first embodiment executes a read command.

FIG. 7 is a timing chart when the storage device according to the first embodiment queues a read command and a non-data command.

FIG. 8 is a flow chart showing an operation when the storage device according to the first embodiment transmits a DATA frame.

FIG. 15A is a flow chart showing an operation when a storage device according to a third embodiment transmits a DATA frame.

DETAILED DESCRIPTION

Figure 1:
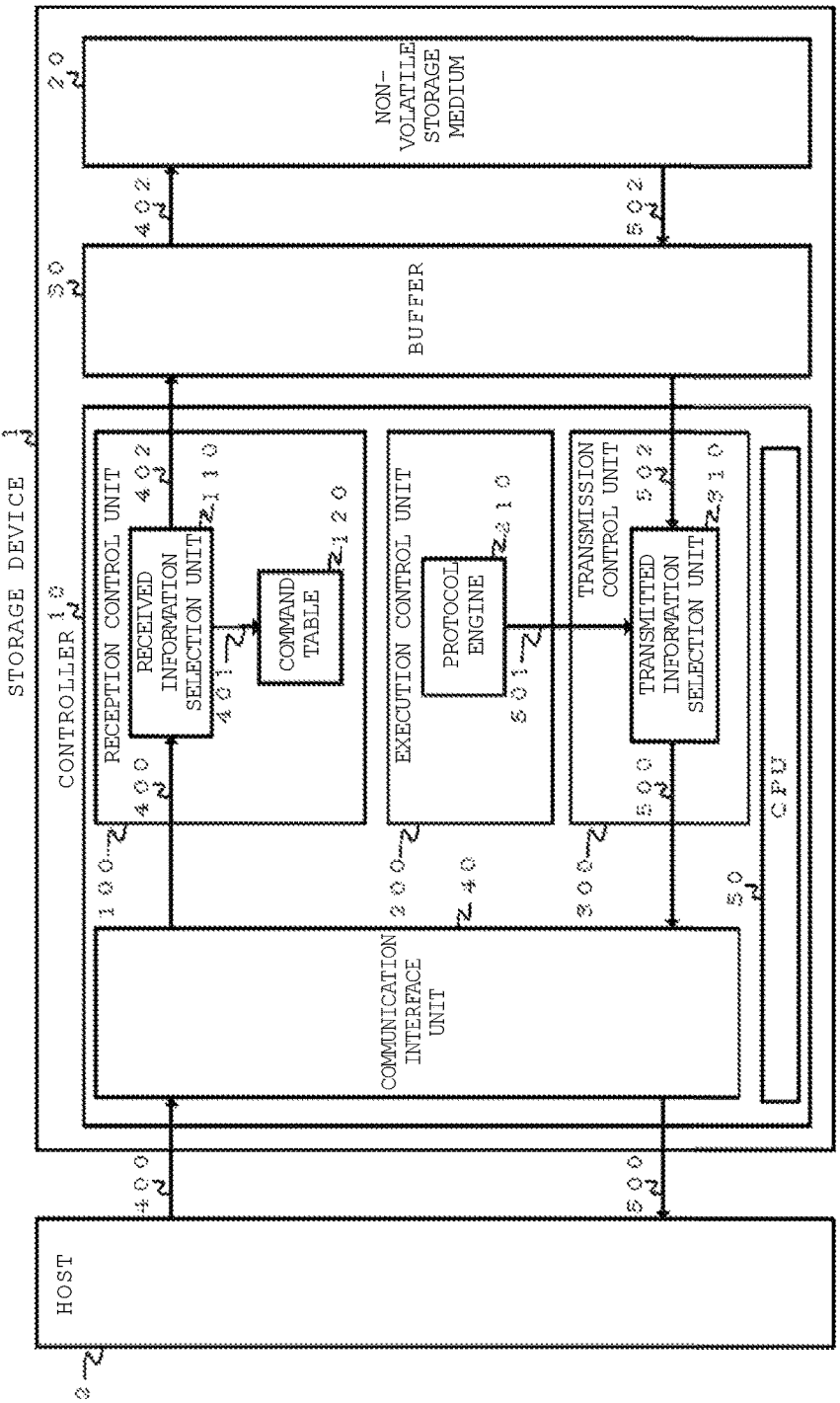
FIG. 1 is a block diagram of a storage device according to a first embodiment.

An embodiment is directed to improving performance of a storage device.

In general, according to an embodiment, a storage device includes a non-volatile storage, and a controller configured to carryout, in parallel, operations in response to a plurality of commands received from a host and queued in a command queue. When the controller receives, from the host, a read command and then a subsequent command before all data read from the non-volatile storage are transmitted to the host in response to the read command, the controller transmits a response to the subsequent command after part of the data read from the non-volatile storage are transmitted to the host and before the all data read from the non-volatile storage are transmitted to the host.

Hereinafter, a storage device according to embodiments will be described with reference to the accompanying drawings. In the following description, components having the same function and configuration will be denoted with common reference numerals and signs.

First Embodiment

FIG. 1 is a block diagram of a storage device 1 according to a first embodiment.

The storage device 1 includes a controller 10 that controls the overall storage device 1, a non-volatile storage medium 20 that stores data, a buffer 30 that temporarily stores data communicated between the host 2 and the non-volatile storage medium 20, and the like.

In the present embodiment, the host 2 is a computer that supports an interface of a serial attached SCSI (SAS) standard, but may be a computer that supports interfaces of other standards, for example, a serial ATA (SATA) standard and a NVM Express (NVMe) standard.

The controller 10 is a semiconductor integrated circuit which is designed as, for example, a system on a chip (SoC).

For example, a NAND-type flash memory, a magnetic disk, or the like is used as the non-volatile storage medium 20.

In the present embodiment, the buffer 30 is a memory configured with a static random access memory (SRAM), but other types of memories such as a dynamic random access memory (DRAM) may be used as the buffer 30. The buffer 30 may be built into the controller 10.

The controller 10 includes a communication interface (IF) unit 40 that communicates with the host 2, a central processing unit (CPU) 50 that executes firmware (FW) to control the overall storage device 1, a reception control unit 100 that controls reception of information from the host 2, an execution control unit 200 that controls execution of a command received from the host 2, a transmission control unit 300 that controls transmission of information to the host 2, and the like.

The CPU 50 may not be built into the controller 10, and instead may be configured as a separate semiconductor integrated circuit. Some or all of the functions performed by the FW in the following description can also be executed by dedicated hardware (HW), and some or all of the functions performed by the HW can also be executed by the FW.

The reception control unit 100 includes a received information selection unit 110 that distributes a command and data received from the host 2, a command table 120 that holds the received command, and the like.

The execution control unit 200 includes a protocol engine 210 that executes a command using a protocol suitable for an interface, and the like.

The transmission control unit 300 includes a transmitted information selection unit 310 that distributes status information and data which are transmitted to the host 2, and the like.

Figure 2:
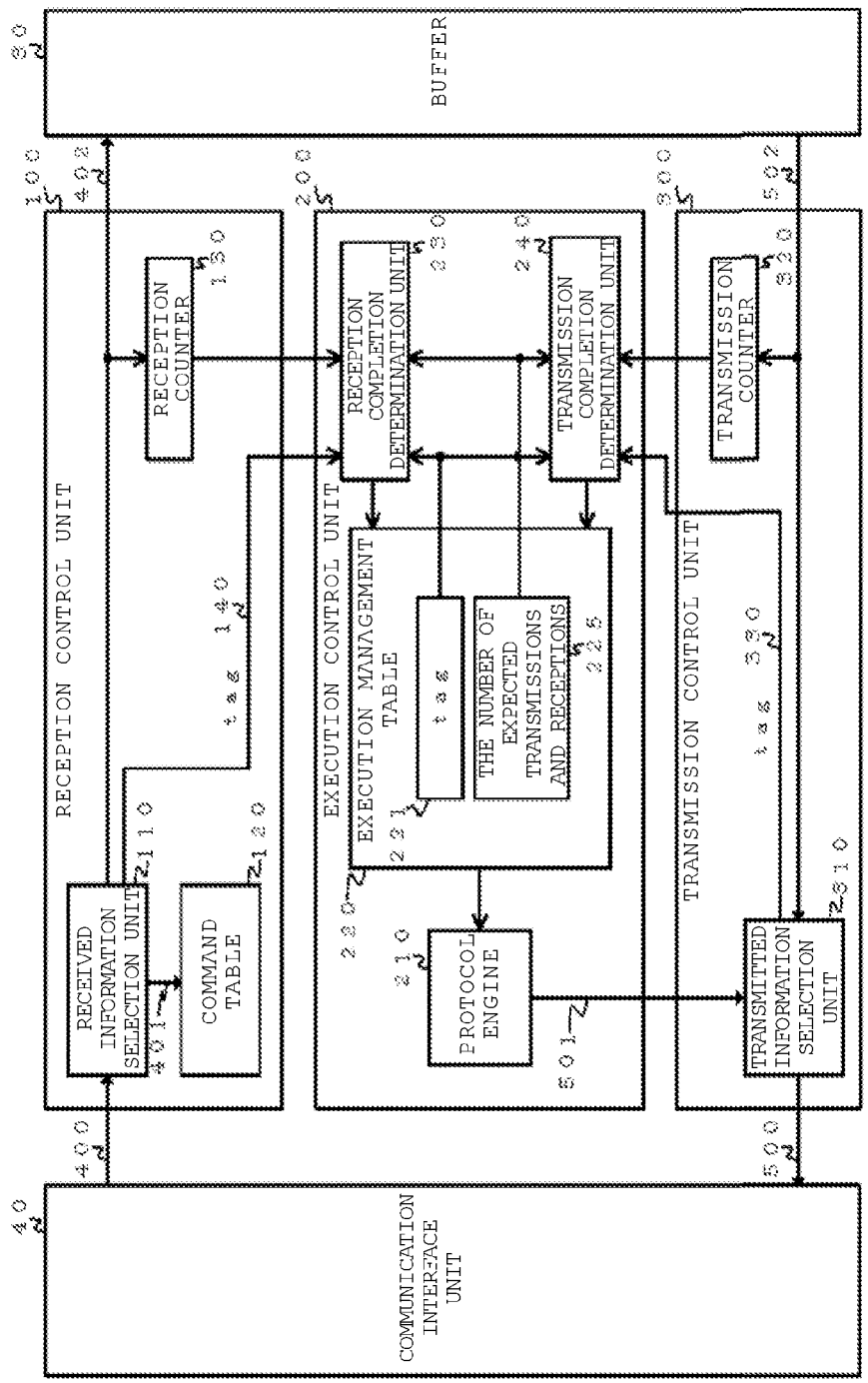
FIG. 2 is a block diagram of a reception control unit, an execution control unit, and a transmission control unit in the storage device according to the first embodiment.

FIG. 2 is a block diagram of the reception control unit 100, the execution control unit 200, and the transmission control unit 300 in the storage device 1 according to the first embodiment.

The received information selection unit 110 in the reception control unit 100 selects a storage destination of information 400 received in the form of a frame from the host 2 on the basis of a frame classification field in a frame header, and stores the information in the storage destination. That is, a COMMAND frame 401, which is command information, is stored in the command table 120, and a DATA frame 402, which is data to be stored in the non-volatile storage medium 20, is stored in the buffer 30.

The COMMAND frame 401 stored in the command table 120 is taken out by the FW, and the FW is executed to analyze the type of command (that is, write command, read command, or non-data command), a logical block address (LBA), the number of transfers, and the like.

In addition, the reception control unit 100 includes a reception counter 130 which counts the length (the number of pieces of data) of the DATA frame 402 stored in the buffer 30, and the value of the reception counter 130 is output to the execution control unit 200.

The transmitted information selection unit 310 in the transmission control unit 300 selects status information 501 indicating an internal state of the storage device 1 and a DATA frame 502, which is data read from the non-volatile storage medium 20 and stored in the buffer 30, under the instruction of the execution control unit 200 and outputs the selected status information and the DATA frame to the communication interface unit 40.

The status information 501 includes a RESPONSE frame for reporting completion of execution of a command and a transfer ready (XFER_RDY) frame for reporting that write data are ready to be received.

In addition, the transmission control unit 300 includes a transmission counter 320 which counts the length (the number of pieces of data) of the DATA frame 502 readout from the buffer 30, and the value of the transmission counter 320 is output to the execution control unit 200.

The execution control unit 200 includes an execution management table 220, a reception completion determination unit 230, and a transmission completion determination unit 240, in addition to the protocol engine 210.

Figure 3:
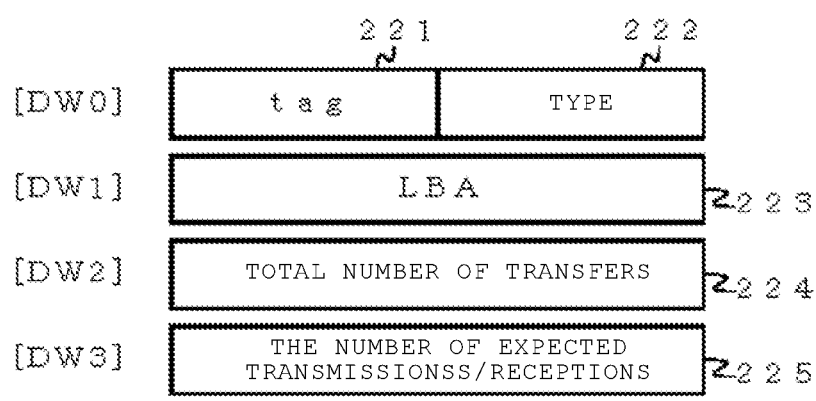
FIG. 3 illustrates a configuration of an execution management table in the storage device according to the first embodiment.

The execution management table 220 is a table for queuing commands and managing execution, and an example of the configuration thereof is shown in FIG. 3. In the execution management table 220, for example, one entry consists of 4DW (double word, 1DW is 32 bits). The number of entries is determined on the basis of the number of commands which are simultaneously queued. For example, in a case where eight commands need to be queued, eight entries each consisting of 4DW should be implemented.

A tag 221 which is added to a frame header in order to identify each command to be queued and executed, a type 222 of the command, a logical block address (LBA) 223 which is designated by the command, the total number of transfers 224 which is designated by the command, and the number of expected transmissions and receptions 225 of data which are currently transmitted and received are set in entries of the execution management table 220.

The number of expected transmissions and receptions 225 is treated as the number of expected transmissions during the execution of a read command and is treated as the number of expected receptions during the execution of a write command. The number of expected transmissions and receptions 225 may be identical with the total number of transfers 224 which is designated by the command. Alternatively, a number based on data stored in the buffer 30 may be set as the number of expected transmissions, and a number based on an empty space of the buffer 30 may be set as the number of expected receptions.

Referring back to FIG. 2, the reception completion determination unit 230 receives a tag 140 of the DATA frame 402 which is currently received and the value of the reception counter 130 from the reception control unit 100, and receives the tag 221 and the number of expected receptions 225 from each entry of the execution management table 220. When the received tag 140 of the DATA frame 402 matches the tag 221 which is set in the execution management table 220 and the value of the number of expected receptions 225 of the entry matches the value of the reception counter 130, the reception completion determination unit 230 notifies the execution management table 220 that write data of the entry has been fully received.

Similarly, the transmission completion determination unit 240 receives a tag 330 of the DATA frame 502 which is currently transmitted and the value of the transmission counter 320 from the transmission control unit 300, and receives the tag 221 and the number of expected transmissions 225 from each entry of the execution management table 220. When the tag 330 of the DATA frame 502 which is transmitted matches the tag 221 which is set in the execution management table 220 and the value of the number of expected transmissions 225 of the entry matches the value of the transmission counter 320, the transmission completion determination unit 240 notifies the execution management table 220 that read data of the entry has been fully transmitted.

Next, a protocol of a command controlled by the execution control unit 200 will be described with reference to FIGS. 4A to 4C.

Figure 4A:
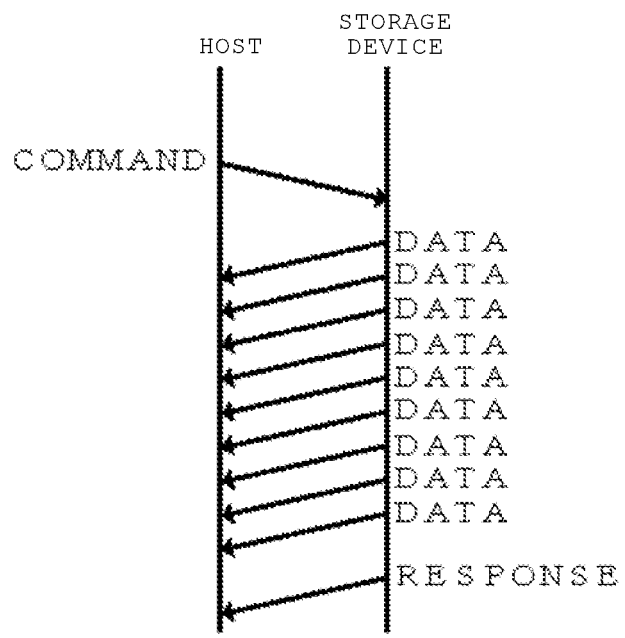
FIG. 4A illustrates a protocol of a read command executed by the storage device according to the first embodiment.

FIG. 4A shows a protocol of a read command.

A COMMAND frame transmitted by the host 2 is stored in the command table 120. After the FW is executed to take out the COMMAND frame and store data read out from the non-volatile storage medium 20 in the buffer 30, and the FW is executed to perform other necessary processes, the tag 221, a read command as the type 222 of command, the LBA 223, the total number of transfers 224 which is designated by a command, and the number of expected transmissions 225 are set in the execution management table 220. Then, the execution management table 220 requests the generation of a DATA frame from the protocol engine 210. The protocol engine 210 having received a request acquires the tag 221 and the number of expected transmissions 225 from the execution management table 220 and acquires data from the buffer 30 to generate a DATA frame. The DATA frame is transmitted to the host 2 through the communication interface unit 40 from the transmitted information selection unit 310 of the transmission control unit 300.

When the storage device 1 transmits the DATA frame to the host 2 and the value of the number of expected transmissions 225 matches the value of the transmission counter 320, the transmission completion determination unit 240 notifies the execution management table 220 that read data have been transmitted.

The execution management table 220 having received the notice that the read data have been transmitted interrupts the FW in a case where the transmission of DATA frames of a total number of transfers which is designated by a command has not been completed, and the FW is executed to perform the setting of the number of expected transmissions 225 and the like again. The execution management table 220 requests the generation of a DATA frame from the protocol engine 210 again, and the DATA frame is transmitted again.

On the other hand, in a case where the transmission of DATA frames of a total number of transfers which is designated by the command has been completed, the execution management table 220 requests the generation of a RESPONSE frame from the protocol engine 210. The protocol engine 210 acquires the tag 221 from the execution management table 220 to generate the RESPONSE frame.

The RESPONSE frame is transmitted to the host 2 through the communication interface unit 40 from the transmitted information selection unit 310 of the transmission control unit 300, and the host 2 can recognize completion of the read command.

Figure 4B:
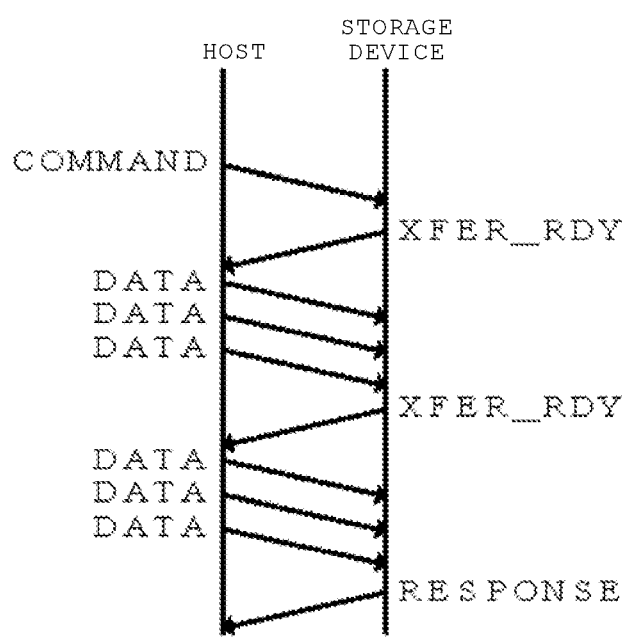
FIG. 4B illustrates a protocol of a write command executed by the storage device according to the first embodiment.

FIG. 4B shows a protocol of a write command.

A COMMAND frame transmitted by the host 2 is stored in the command table 120. After the FW is executed to take out the COMMAND frame and allocate a space of the buffer 30, and perform other necessary processes, the tag 221, a write command as the type 222 of command, the LBA 223, the total number of transfers 224 which is designated by the command, and the number of expected receptions 225 are set in the execution management table 220. Then, the execution management table 220 requests the generation of a transfer ready (XFER_RDY) frame from the protocol engine 210. The protocol engine 210 having received the request acquires the tag 221 and the number of expected receptions 225 from the execution management table 220 to generate the XFER_RDY frame. The XFER_RDY frame is transmitted to the host 2 through the communication interface unit 40 from the transmitted information selection unit 310 of the transmission control unit 300.

The host 2 having received the XFER_RDY frame transmits a DATA frame. When the storage device 1 receives the DATA frame, the reception control unit 100 stores the DATA frame in the buffer 30. When the value of the number of expected receptions 225 matches the value of the reception counter 130, the reception completion determination unit 230 notifies the execution management table 220 that write data have been received.

The execution management table 220 having received the notice that the write data have been received interrupts the FW in a case where the reception of DATA frames of a total number of transfers which is designated by the command has not been completed, and the FW is executed to perform the setting of the number of expected receptions 225 and the like again. The execution management table 220 requests the generation of a XFER_RDY frame from the protocol engine 210 again, and the XFER_RDY frame is transmitted again.

On the other hand, in a case where the reception of DATA frames corresponding to the total number of transfers which is designated by the command has been completed, the execution management table 220 requests the generation of a RESPONSE frame from the protocol engine 210. The protocol engine 210 acquires the tag 221 from the execution management table 220 to generate the RESPONSE frame.

The RESPONSE frame is transmitted to the host 2 through the communication interface unit 40 from the transmitted information selection unit 310 of the transmission control unit 300, and the host 2 can recognize completion of the write command.

Figure 4C:
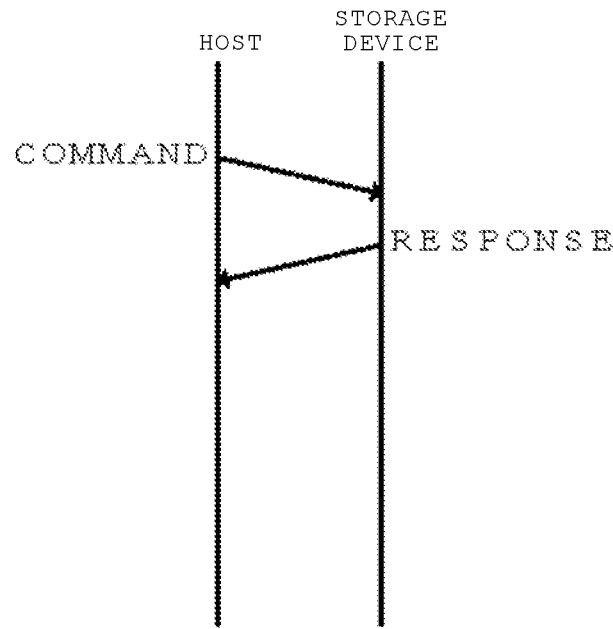
FIG. 4C illustrates a protocol of a non-data command executed by the storage device according to the first embodiment.

FIG. 4C shows a protocol of a non-data command. A non-data command does not result in an exchange of data (in particular, DATA frame) between the host 2 and the storage device 1. Examples include a TEST_UNIT_READY command, which is used to check if the storage device 1 has been started up, and a FLUSH_CACHE command, which is used to request the storage device 1 to flush cached data into the non-volatile storage medium 20.

A COMMAND frame transmitted by the host 2 is stored in the command table 120. After the FW is executed to take out the COMMAND frame and perform a necessary process, a non-data command is set in the execution management table 220 as the type 222 of command and the tag 221 is set in the execution management table 220. In a case of the non-data command, the LBA 223, the total number of transfers 224, and the number of expected transmissions and receptions 225 are not required to be set. Then, the execution management table 220 requests the generation of a RESPONSE frame from the protocol engine 210. The protocol engine 210 having received the request acquires the tag 221 from the execution management table 220 to generate the RESPONSE frame.

The RESPONSE frame is transmitted to the host 2 through the communication interface unit 40 from the transmitted information selection unit 310 of the transmission control unit 300, and the host 2 can recognize completion of the non-data command.

Figure 5:
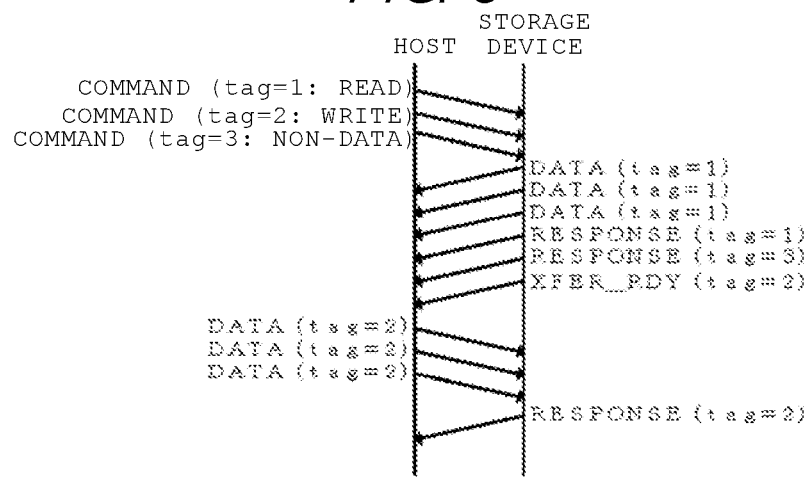
FIG. 5 illustrates queuing and executing of a command by the storage device according to the first embodiment.

Next, an example of a protocol when a plurality of commands is queued and executed will be described with reference to FIG. 5.

The host 2 transmits a read command with a COMMAND frame of tag=1, transmits a write command with a COMMAND frame of tag=2, and transmits a non-data command with a COMMAND frame of tag=3.

The storage device 1 transmits a DATA frame and a RESPONSE frame with respect to the read command of tag=1, and then transmits a RESPONSE frame with respect to the non-data command of tag=3 and a XFER_RDY frame with respect to the write command of tag=2.

The host 2 transmits a DATA frame with respect to the write command of tag=2, and the storage device 1 transmits a RESPONSE frame with respect to the write command of tag=2.

FIG. 6 is a timing chart when the storage device 1 of the present embodiment executes a read command.

Here, 0x1000 (bytes) is set in the number of expected transmissions 225 of the execution management table 220, and DATA frames (DATA0 to DATA3) each of which consists of 0x400 bytes are transmitted. The transmission counter 320 is incremented by 0x400 for each transmission of the DATA frame. When values of the number of expected transmissions 225 and the transmission counter 320 match to each other at 0x1000, the transmission completion determination unit 240 notifies the execution management table 220 that the transmission of read data is completed. In a case where the transmission of DATA frames of a total number of transfers which is designated by a command is completed, the protocol engine 210 generates a RESPONSE frame and transmits the generated RESPONSE frame to the host 2.

In the present embodiment, the transmission counter 320 is incremented by the length of a DATA frame, but may be incremented in smaller units (for example, in units of bytes or in units of DW).

FIG. 7 is a timing chart when the storage device 1 of the present embodiment queues and executes a read command and a non-data command.

Here, 0x2000 (bytes) is set in the execution management table 220 as the number of expected transmissions 225 with respect to a read command of tag=4, and the transmission of DATA frames each of which consists of 0x400 bytes is started (DATA0 to DATA2).

On the other hand, the processing of a non-data command of tag=5 is completed, and the execution management table 220 requests the protocol engine 210 to generate a RESPONSE frame of tag=5. The protocol engine 210 generates the RESPONSE frame of tag=5, temporarily switches the transmitted information selection unit 310 before the transmission of DATA frames corresponding to the number of expected transmissions with respect to the read command of tag=4 is completed (after the transmission of DATA2 is completed and before the transmission of DATA3 is started), and transmits the RESPONSE frame of tag=5. When the transmission of the RESPONSE frame of tag=5 is completed, the protocol engine 210 switches the transmitted information selection unit 310 again and transmits the rest of DATA frames (DATA3 and the subsequent DATA frames) with respect to the read command of tag=4.

In the present embodiment, the transmitted information selection unit 310 is switched over at a frame boundary between DATA frames, but may be switched in smaller units (for example, in units of bytes).

FIG. 8 is a flow chart showing an operation when the storage device 1 of the present embodiment transmits a DATA frame.

After the number of expected transmissions 225 is set in the execution management table 220 (S800), a DATA frame is transmitted (S801). Next, it is determined whether or not the value of the number of expected transmissions 225 matches the value of the transmission counter 320, that is, whether or not the transmission of DATA frames corresponding to the number of expected transmissions is completed (S802). In a case where the transmission of DATA frames corresponding to the number of expected transmissions is not completed, it is determined whether or not there is a command of which execution is completed, that is, whether or not a request for the generation of a RESPONSE frame is made (S803). In a case where a request for the generation of the RESPONSE frame is not made, the process returns to S801 to continue transmitting a DATA frame. In a case where a request for the generation of the RESPONSE frame is made, the RESPONSE frame is generated and transmitted (S804). Then, the process returns to S801 to start transmitting a DATA frame again.

Figure 9:
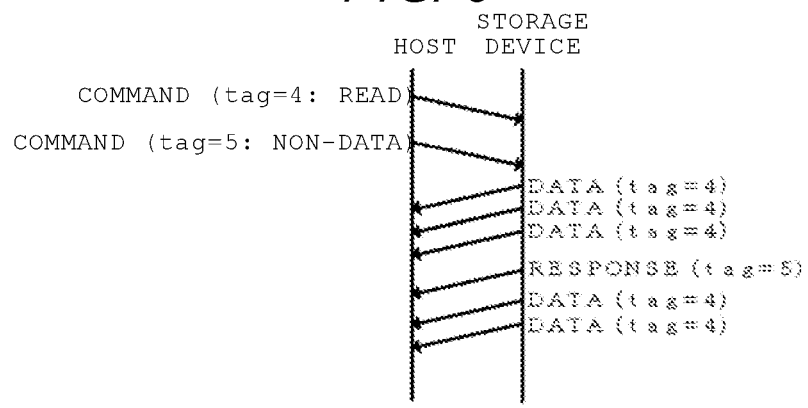
FIG. 9 illustrates an operation when the storage device according to the first embodiment queues a read command and a non-data command.

FIG. 9 is a diagram showing an operation when the storage device 1 of the present embodiment queues and executes a read command and a non-data command.

The host 2 transmits a read command with a COMMAND frame of tag=4, and transmits a non-data command with a COMMAND frame of tag=5.

The storage device 1 transmits a RESPONSE frame with respect to the non-data command of tag=5 before the transmission of DATA frames corresponding to the number of expected transmissions with respect to the read command of tag=4 is completed, and then transmits the rest of DATA frames with respect to the read command of tag=4.

In the above-description, a case where a read command and a non-data command are queued and executed is described. Similarly, also in a case where a read command and a write command are queued and executed, it is possible to transmit a RESPONSE frame with respect to the write command before the completion of transmission of the number of expected transmissions after the transmission of a DATA frame is started.

According to the above-described storage device of the first embodiment, when it is necessary to transmit a RESPONSE frame after the start of transmission of DATA frames for which the number of expected transmissions is determined, the transmission of the DATA frames is temporarily stopped, and the RESPONSE frame is preferentially transmitted. Accordingly, it is possible to execute commands, which are queued and executed, in an appropriate order and to improve the performance of the storage device.

Second Embodiment

Figure 10:
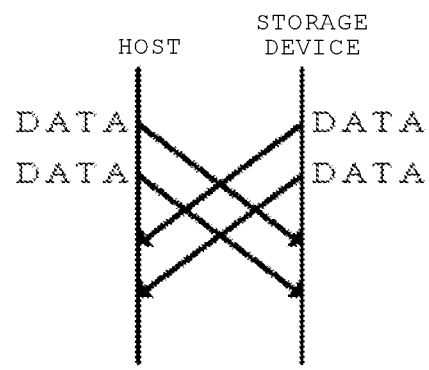
FIG. 10 illustrates an operation of a full duplex communication system employed in a storage device according to a second embodiment.

FIG. 10 is a diagram showing a full duplex communication system.

As shown in FIG. 10, in the full duplex communication system, a storage device 1 can transmit a DATA frame with respect to a read command to a host 2 at the same time as when the host 2 transmits a DATA frame with respect to a write command to the storage device 1.

Figure 11:
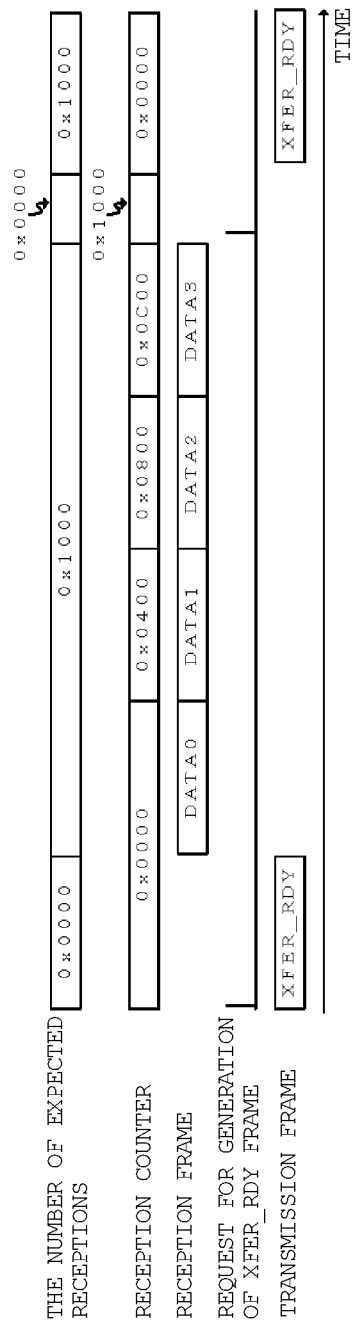
FIG. 11 is a timing chart when the storage device according to the second embodiment executes a write command.

FIG. 11 is a timing chart when the storage device 1 of the present embodiment executes a write command.

When 0x1000 (bytes) is set in the number of expected receptions 225 of an execution management table 220, a protocol engine 210 generates a XFER_RDY frame and transmits the generated XFER_RDY frame to the host 2. The host 2 receiving the XFER_RDY frame transmits DATA frames (DATA0 to DATA3) each of which consists of 0x400 bytes. A reception counter 130 is incremented by 0x400 for each reception of the DATA frame. When values of the number of expected receptions 225 and the reception counter 130 match each other at 0x1000, a reception completion determination unit 230 notifies the execution management table 220 that the reception of write data is completed. In a case where the reception of DATA frames of a total number of transfers which is designated by a command is not completed, the execution management table 220 interrupts the FW. The FW is executed to set the number of expected receptions 225 of the execution management table 220 again, and the XFER_RDY frame is transmitted to the host 2 again.

In the present embodiment, the reception counter 130 is incremented by the length of a DATA frame, but may be incremented in smaller units (for example, in units of bytes or in units of DW).

Figure 12:
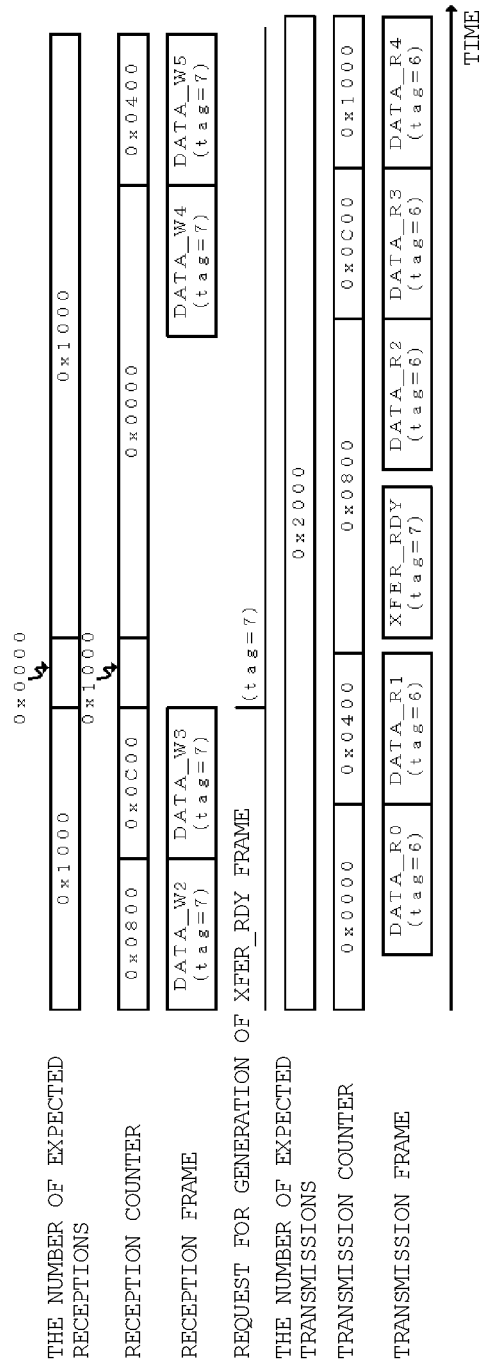
FIG. 12 is a timing chart when the storage device according to the second embodiment queues a read command and a write command.

FIG. 12 is a timing chart when the storage device 1 of the present embodiment queues and executes a read command and a write command.

Here, 0x2000 (bytes) is set in the execution management table 220 as the number of expected transmissions 225 with respect to a read command of tag=6, and the transmission of DATA frames each of which consists of 0×400 bytes is started (DATA_R0 to DATA_R1).

On the other hand, regarding a write command of tag=7, after the reception of DATA frames (DATA_W2 to DATA_W3) with respect to the number of expected receptions of 0×1000 (bytes) is completed and the processing of the FW is completed, the execution management table 220 requests the protocol engine 210 to generates a XFER_RDY frame of tag=7.

The protocol engine 210 generates the XFER_RDY frame of tag=7, temporarily switches a transmitted information selection unit 310 before the transmission of DATA frames corresponding to the number of expected transmissions with respect to the read command of tag=6 is completed (after the transmission of DATA_R1 is completed and before the transmission of DATA_R2 is started), and transmits the XFER_RDY frame of tag=7. When the transmission of the XFER_RDY frame of tag=7 is completed, the protocol engine 210 switches the transmitted information selection unit 310 again and transmits the rest of the DATA frames (DATA_R2 and the subsequent DATA frames) with respect to the read command of tag=6.

The host 2 receiving the XFER_RDY frame of tag=7 can transmit the rest of DATA frames (DATA_W4 and the subsequent DATA frames) with respect to the write command of tag=7, and can receive the rest of DATA frames (DATA_R2 and the subsequent DATA frames) with respect to the read command of tag=6.

In the present embodiment, the transmitted information selection unit 310 is switched at a frame boundary between DATA frames, but may be switched in smaller units (for example, in units of bytes).

Figure 13:
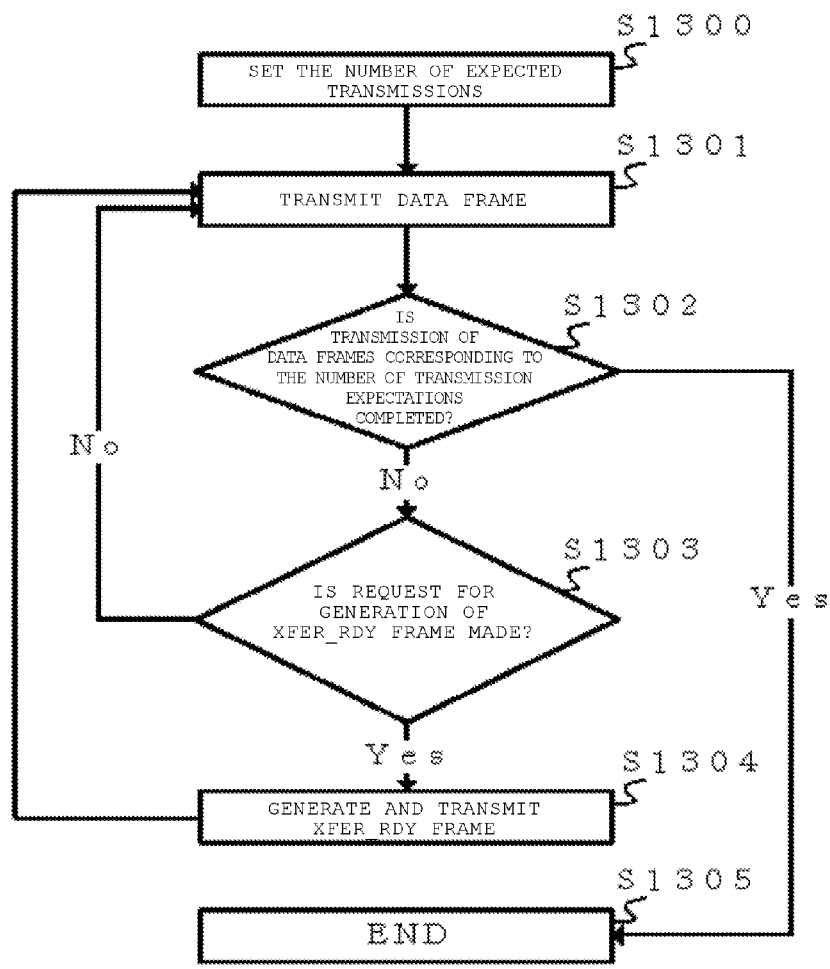
FIG. 13 is a flow chart showing an operation when the storage device according to the second embodiment transmits a DATA frame.

FIG. 13 is a flow chart showing an operation when the storage device 1 of the present embodiment transmits a DATA frame.

After the number of expected transmissions 225 is set in the execution management table 220 (S1300), a DATA frame is transmitted (S1301). Next, it is determined whether or not the value of the number of expected transmissions 225 matches the value of the transmission counter 320, that is, whether or not the transmission of DATA frames corresponding to the number of expected transmissions is completed (S1302). In a case where the transmission of DATA frames corresponding to the number of expected transmissions is not completed, it is determined whether or not there is a command by which write data can be received, that is, whether or not a request for the generation of a XFER_RDY frame is made (S1303). In a case where a request for the generation of the XFER_RDY frame is not made, the process returns to S1301 to continue transmitting a DATA frame. In a case where a request for the generation of the XFER_RDY frame is made, the XFER_RDY frame is generated and transmitted (S1304). Then, the process returns to S1301 to start transmitting the DATA frame again.

Figure 14:
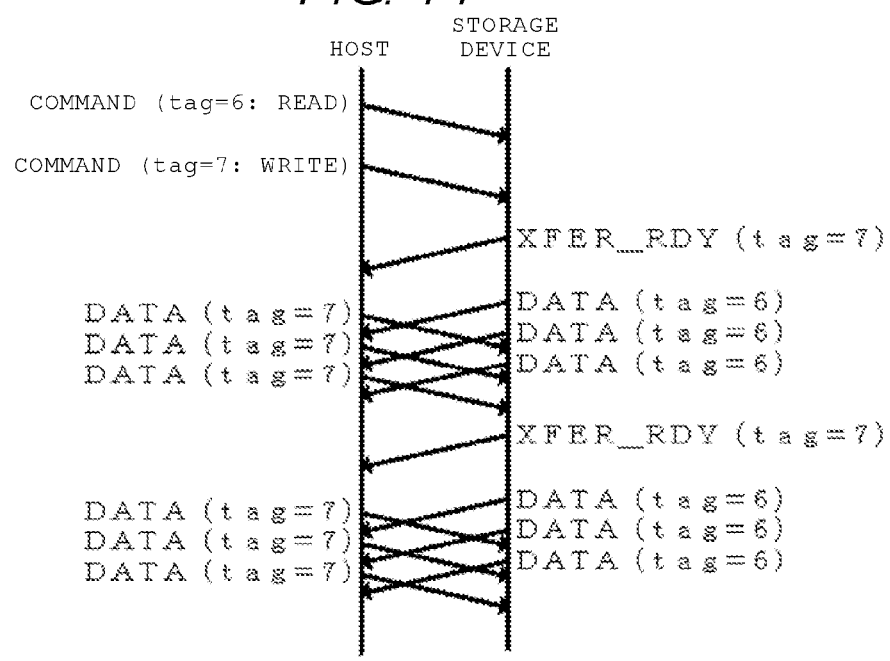
FIG. 14 illustrates an operation when the storage device according to the second embodiment queues a read command and a write command.

FIG. 14 is a diagram showing an operation when the storage device 1 of the present embodiment queues and executes a read command and a write command.

The host 2 transmits a read command with a COMMAND frame of tag=6, and transmits a write command with a COMMAND frame of tag=7.

The storage device 1 transmits a XFER_RDY frame with respect to the write command of tag=7, and starts transmitting a DATA frame with respect to the read command of tag=6 at the same time as the reception of a DATA frame with respect to the write command of tag=7.

The storage device 1 transmits a XFER_RDY frame with respect to the write command of tag=7 again before the transmission of DATA frames corresponding to the number of expected transmissions with respect to the read command of tag=6 is completed, and then transmits the rest of DATA frames with respect to the read command of tag=6.

According to the above-described storage device of the second embodiment, when it is necessary to transmit a XFER_RDY frame after the start of transmission of DATA frames for which the number of expected transmission is determined, the transmission of the DATA frames is temporarily stopped, and the XFER_RDY frame is preferentially transmitted. For that reason, it is possible to execute commands, which are queued and executed, in an appropriate order and to improve the performance of the storage device. In a case of a full duplex communication system, it is possible to more efficiently use a channel of communication with the host 2.

Third Embodiment

A storage device 1 according to a third embodiment has a threshold value for determining whether to transmit status information 501 indicating the internal state of the storage device 1 after starting of transmitting DATA frames for which the number of expected transmissions is determined, by temporarily stopping transmitting the DATA frames. The threshold value may be set at an appropriate location within the storage device 1, for example, at a register provided within an execution control unit 200.

FIG. 15A is a flow chart showing an operation when the storage device 1 of the present embodiment transmits a DATA frame.

After the number of expected transmissions 225 is set in the execution management table 220 (S1500a), a DATA frame is transmitted (S1501a). Next, it is determined whether or not the value of the number of expected transmissions 225 matches the value of a transmission counter 320, that is, whether or not the transmission of DATA frames corresponding to the number of expected transmissions is completed (S1502a). Next, it is determined whether a difference between the value of the number of expected transmissions 225 and the value of the transmission counter 320 is equal to or greater than a threshold value, that is, whether or not a remaining amount of transmission of DATA frames is large (S1503a).

In a case where the difference between the value of the number of expected transmissions 225 and the value of the transmission counter 320 is equal to or greater than the threshold value, it is determined whether or not there is a command of which execution is completed, that is, whether or not a request for generation of a RESPONSE frame is made (S1504a). In a case where the request for the generation of the RESPONSE frame is not made, the process returns to S1501a to continue transmitting a DATA frame. In a case where the request for the generation of the RESPONSE frame is made, the RESPONSE frame is generated and transmitted (S1505a). Then, the process returns to S1501a to start transmitting a DATA frame again.

In a case where the request for the generation of the RESPONSE frame is made when the difference between the value of the number of expected transmissions 225 and the value of the transmission counter 320 is less than the threshold value (S1503a: No), after the transmission of DATA frames corresponding to the number of expected transmissions is completed (S1506a), the RESPONSE frame is generated and transmitted.

Figure 15B:
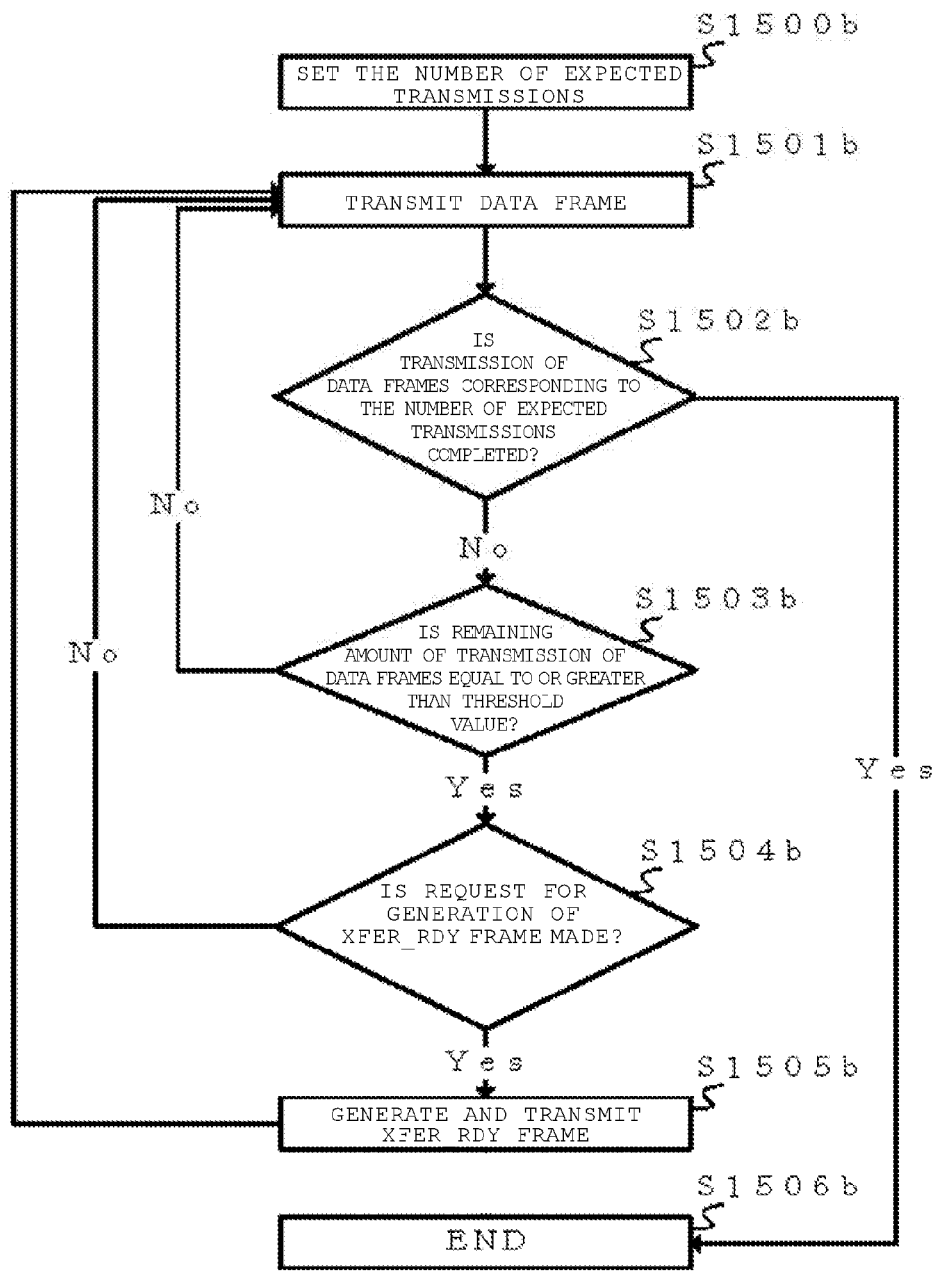
FIG. 15B is a flow chart showing an operation when the storage device according to the third embodiment transmits a DATA frame.

Similarly, FIG. 15B is a flowchart showing an operation when the storage device 1 according to the present embodiment transmits a DATA frame.

Although FIG. 15B is substantially the same as FIG. 15A, steps (S1504a to S1505a) related to the RESPONSE frame of FIG. 15A are replaced with steps (S1504b to S1505b) related to a XFER_RDY frame in FIG. 15B.

According to the above-described storage device of the third embodiment, when it is necessary to transmit status information indicating the internal state of the storage device after the start of transmission of DATA frames for which the number of transmission expectations is determined, the status information is preferentially transmitted only when a remaining amount of transmission of DATA frames is large, and thus it is possible to execute commands, which are queued and executed, in an appropriate order while preventing the division of transmission of DATA frames and to improve the performance of the storage device.

Fourth Exemplary Embodiment

Figure 16:
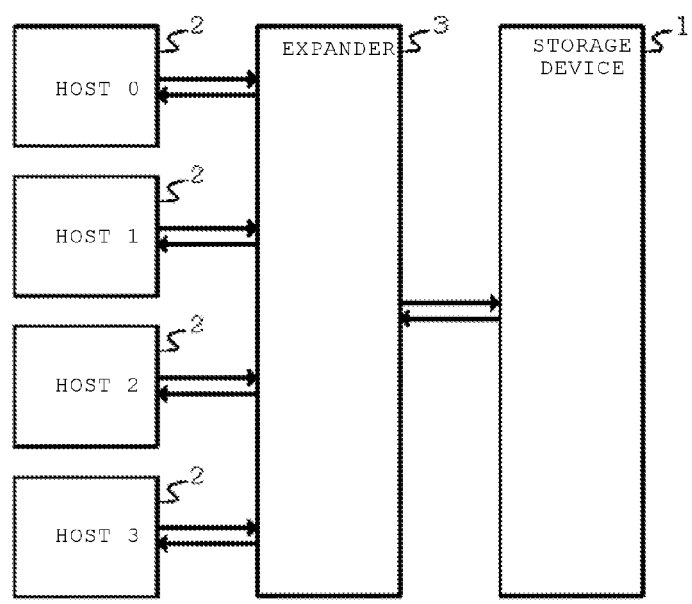
FIG. 16 illustrates a mode of connection between a storage device according to a fourth embodiment and a plurality of hosts.

In an SAS interface, as shown in FIG. 16, a storage device 1 and a plurality of hosts 2 can communicate with each other through a repeater called an expander 3. The storage device 1 and the hosts 2 are distinguished from each other by worldwide name (WWN) identifiers respectively provided in the storage device 1 and the hosts 2. The storage device 1 and the hosts 2 establish logical connection before transmitting a frame to the counterpart, and have to rapidly disconnect the logical connection after the transmission.

Figure 17:
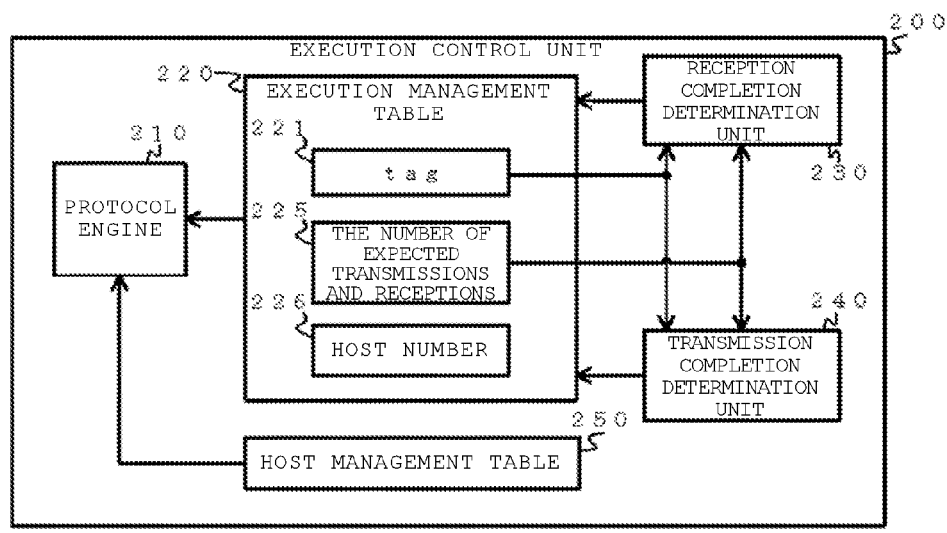
FIG. 17 is a block diagram of an execution control unit of the storage device according to the fourth embodiment.

FIG. 17 is a block diagram showing a detailed configuration of an execution control unit 200 in the storage device 1 according to the present embodiment.

The execution control unit 200 includes a host management table 250 in addition to the protocol engine 210, the execution management table 220, the reception completion determination unit 230, and the transmission completion determination unit 240.

The host management table 250 is a table that manages a WWN of a host 2 which is a communication party, a communication speed, and the like, and is updated whenever logical connection to the host 2 is established. The number of entries is determined on the basis of the number of hosts 2 that are required to be simultaneously managed. For example, in a case where it is necessary to manage eight hosts 2, eight entries are provided.

Figure 18:
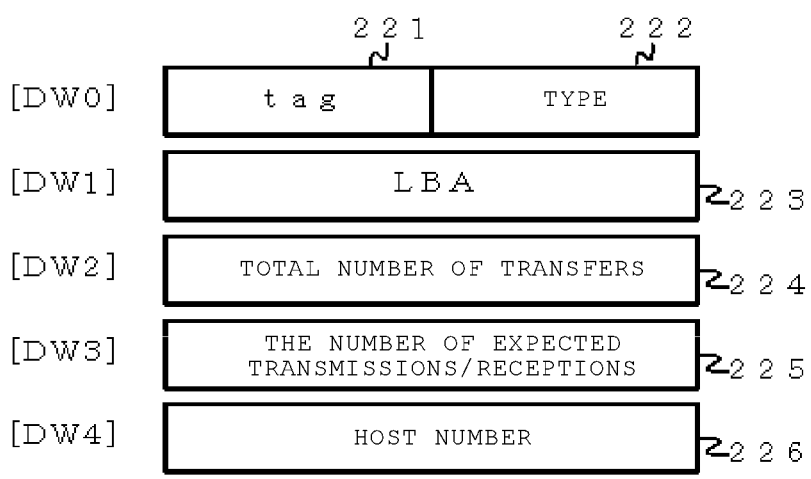
FIG. 18 illustrates a configuration of an execution management table in the storage device according to the fourth embodiment.

FIG. 18 shows a configuration of the execution management table 220 of the storage device 1 according to the present embodiment. A difference from that shown in FIG. 3 is that the execution management table 220 of the present embodiment includes a host number 226 indicating an entry number of the host management table.

Referring back to FIG. 17, the host number 226 is input to the protocol engine 210 from the execution management table 220, and information of the host management table 250 is input to the protocol engine 210. Thereby, the protocol engine 210 can ascertain the WWN of a host 2 to which logical connection is presently established, and the like.

Figure 19:
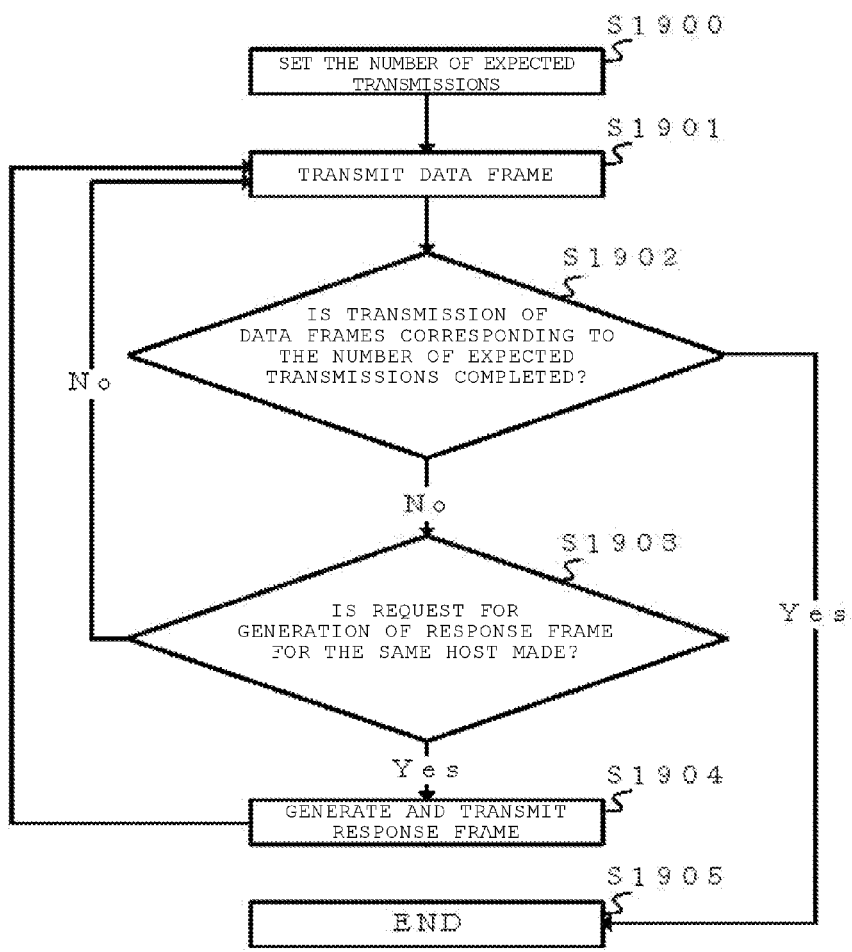
FIG. 19 is a flow chart showing an operation when the storage device according to the fourth embodiment transmits a DATA frame.

FIG. 19 is a flow chart showing an operation when the storage device 1 according to the present embodiment transmits a DATA frame.

After the number of expected transmissions 225 is set in the execution management table 220 (S1900), a DATA frame is transmitted (S1901). Next, it is determined whether or not the value of the number of expected transmissions 225 matches the value of a transmission counter 320, that is, whether or not the transmission of DATA frames corresponding to the number of expected transmissions is completed (S1902). In a case where the transmission of DATA frames corresponding to the number of expected transmissions is not completed, it is determined whether or not there is a command of which execution is completed, among commands received from the host 2 that presently transmits a DATA frame, that is, whether or not a request for the generation of a RESPONSE frame is made (S1903). In a case where the request for the generation of the RESPONSE frame is not made, the process returns to S1901 to continue transmitting a DATA frame. In a case where the request for the generation of the RESPONSE frame is made, the RESPONSE frame is generated and transmitted (S1904). Then, the process returns to S1901 to start transmitting a DATA frame again.

According to the above-described storage device of the fourth embodiment, when it is necessary to transmit a RESPONSE frame for the same host after the start of transmission of DATA frames for which the number of expected transmissions is determined, the transmission of the DATA frames is temporarily stopped, and the RESPONSE frame is preferentially transmitted. Accordingly, it is possible to execute commands, which are queued and executed, in an appropriate order without increasing the number of establishments of logical connection between a host and the storage device more than necessary, and to improve the performance of the storage device.

According to the above-described storage device of at least one embodiment, when it is necessary to transmit status information indicating the internal state of the storage device after the start of transmission of DATA frames for which the number of expected transmissions is determined, the transmission of the DATA frames is temporarily stopped, and the status information is preferentially transmitted. Accordingly, it is possible to execute commands, which are queued and executed, in an appropriate order and to improve performance of the storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
   a non-volatile storage;
   a data buffer; and
   a controller configured to carry out, in parallel, operations in response to a plurality of commands received from a host and queued in a command queue, wherein
   when the controller receives, from the host, a read command and then a subsequent command before all data read from the non-volatile storage are transmitted to the host in response to the read command, the controller transmits a response to the subsequent command after part of the data read from the non-volatile storage are transmitted to the host and before the all data read from the non-volatile storage are transmitted to the host, and wherein
   the controller is configured to temporarily store the data read from the non-volatile storage in the data buffer in response to the read command, determine the number of data transmissions based on a size of the data stored in the data buffer, and transmit the response to the subsequent command to the host upon completing data transmissions of the determined number, and the controller postpones the transmission of at least part of the data stored in the data buffer, after determining that a difference between the determined number of data transmissions and a number of data transmissions that have been carried out in response to the read command is greater than a threshold.

2. The storage device according to claim 1, wherein
when the subsequent command is a non-data command that does not require exchange of data between the storage device and the host, the response includes status information of the storage device.

3. The storage device according to claim 1, wherein
when the subsequent command is a write command, the response includes a notification that the storage device is ready to receive write data from the host.

4. The storage device according to claim 3, wherein
when the subsequent command is the write command, the controller further transmits a completion notification of the write command before the all data read from the non-volatile storage are transmitted to the host.

5. The storage device according to claim 3, wherein
communication between the storage device and the host supports a full duplex communication system in accordance with which data transmission from the host to the storage device and data transmission from the storage device to the host can be carried out in parallel.

6. The storage device according to claim 1, wherein
when the storage device is connected to a plurality of hosts, the controller transmits the response to the subsequent command after determining that the read command and the subsequent command are received from the same host.

7. The storage device according to claim 1, wherein
when the subsequent command is a write command and the controller receives, from the host, a second subsequent command before all of write data to be written into the non-volatile storage are received from the host in association with the write command, the controller postpones completion of the write command and transmits a response to the second subsequent command.

8. The storage device according to claim 7, wherein
when the second subsequent command is a non-data command that does not require exchange of data between the storage device and the host, the response to the second subsequent command includes status information of the storage device.

9. A method of operating a storage device including a non-volatile storage and a data buffer, comprising:
receiving a read command from a host;
in response to the read command, temporarily storing the data read from the non-volatile storage in the data buffer, determining the number of data transmissions based on a size of the data stored in the data buffer, and starting data transmission of data read from the non-volatile storage to the host; and when a subsequent command is received from the host before all data read from the non-volatile storage are transmitted to the host, transmitting a response to the subsequent command after part of the data read from the non-volatile storage are transmitted to the host and before the all data read from the non-volatile storage are transmitted to the host, wherein the response to the subsequent command to the host is transmitted upon completing data transmissions of the determined number, and the transmission of at least part of the data stored in the data buffer is postponed, after determining that a difference between the determined number of data transmissions and a number of data transmissions that have been carried out in response to the read command is greater than a threshold.

10. The method according to claim 9, wherein
when the subsequent command is a non-data command that does not require exchange of data between the storage device and the host, the response includes status information of the storage device.

11. The method according to claim 9, wherein
when the subsequent command is a write command, the response includes a notification that the storage device is ready to receive write data from the host.

12. The method according to claim 11, wherein
when the subsequent command is the write command, a completion notification of the write command is transmitted before the all data read from the non-volatile storage are transmitted to the host.

13. The method according to claim 11, wherein
communication between the storage device and the host supports a full duplex communication system in accordance with which data transmission from the host to the storage device and data transmission from the storage device to the host can be carried out in parallel.

14. The method according to claim 9, wherein
when the storage device is connected to a plurality of hosts, the response to the subsequent command is transmitted after determining that that the read command and the subsequent command are received from the same host.

15. The method according to claim 9, wherein
when the subsequent command is a write command and a second subsequent command is received from the host before all of write data to be written into the non-volatile storage are received from the host in association with the write command, the completion of the write command is postponed and a response to the second subsequent command is transmitted.

16. The method according to claim 15, wherein
when the second subsequent command is a non-data command that does not require exchange of data between the storage device and the host, the response to the second subsequent command includes status information of the storage device.

* * * * *